United States Patent [19]

Groll et al.

[11] Patent Number: 4,647,409

[45] Date of Patent: Mar. 3, 1987

[54] COPPER-PHTHALOCYANINE DYESTUFFS

[75] Inventors: Manfred Groll, Leverkusen; Dieter Ockelmann, Cologne, both of Fed. Rep. of Germany

[73] Assignee: Bayer Aktiengesellschaft, Leverkusen, Fed. Rep. of Germany

[21] Appl. No.: 774,205

[22] Filed: Sep. 9, 1985

[30] Foreign Application Priority Data

Sep. 13, 1984 [DE] Fed. Rep. of Germany ....... 3433613

[51] Int. Cl.$^4$ .............................................. C09B 47/04
[52] U.S. Cl. ..................................... 540/134; 540/125
[58] Field of Search ........................... 260/242.2, 245.8

[56] References Cited

U.S. PATENT DOCUMENTS 2,863,875 12/1958 Bienert et al. ..................... 260/245.8
3,057,873 10/1962 Pugin et al. ....................... 260/245.8
4,448,722 5/1984 Crounse ............................ 260/245.8

FOREIGN PATENT DOCUMENTS 1049996 2/1959 Fed. Rep. of Germany.
1064661 9/1959 Fed. Rep. of Germany.

Primary Examiner—Richard L. Raymond

Attorney, Agent, or Firm—Sprung Horn Kramer & Woods

[57] ABSTRACT

Basic copper-phthalocyanine dyestuffs of the formula

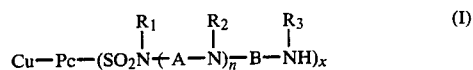

in which
Cu—Pc denotes the radical of an x-valent copper-phthalocyanine,
A and B independently of each other denote an alkylene radical having 2 to 5 carbon atoms,
$R_1$ and $R_3$ independently of each other denote hydrogen or an alkyl radical having 1 to 3 carbon atoms which is optionally substituted by hydroxyl, $C_1$- to $C_3$-alkoxy, halogen or an $NH_2$ group,
$R_2$ denotes an alkyl group having 1 to 3 carbon atoms which is optionally substituted by hydroxyl, $C_1$- to $C_3$-alkoxy or halogen,
n denotes the number 1 to 3,
x denotes the value 1.8 to 2.5,
or if $n=1$ and $A=C_2H_4$, $R_1+R_2$ denotes an ethylene bridge.

find utility for dyeing paper.

5 Claims, No Drawings

COPPER-PHTHALOCYANINE DYESTUFFS

The invention relates to basic copper-phthalo-cyanine dyestuffs of the general formula

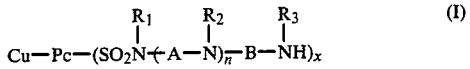

in which
Cu—Pc denotes the radical of an x-valent copper-phthalocyanine,
A and B independently of each other denote an alkylene radical having 2 to 5 carbon atoms,
$R_1$ and $R_3$ independently of each other denote hydrogen or an alkyl radical having 1 to 3 carbon atoms which is optionally substituted by hydroxyl, $C_1$- to $C_3$-alkoxy, halogen or an $NH_2$ group,
$R_2$ denotes an alkyl group having 1 to 3 carbon atoms which is optionally substituted by hydroxyl, $C_1$- to $C_3$-alkoxy or halogen,
n denotes the number 1 to 3,
x denotes the value 1.8 to 2.5,
or if n=1 and A=$C_2H_4$, $R_1+R_2$ denotes an ethylene bridge,
to their aqueous solutions, to their preparation, and to their use for dyeing paper.

Of the dyestuffs of the formula (I), preference is given to the dyestuffs of the formula

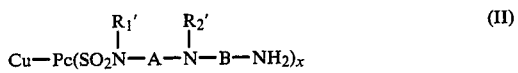

in which
Cu—Pc, A, B and x have the meaning indicated in the formula (I),
$R_1'$ denotes hydrogen or an alkyl radical having 1 to 3 carbon atoms which is optionally substituted by hydroxyl, $C_1$- to $C_3$-alkoxy or halogen,
$R_2'$ denotes an alkyl group having 1 to 3 carbon atoms which is optionally substituted by hydroxyl, $C_1$- to $C_3$-alkoxy or halogen,
or if A=ethylene, $R_1+R_2$ denotes an ethylene bridge.

Particular preference is given to dyestuffs of the formula

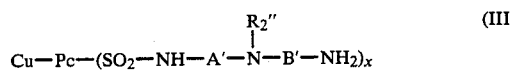

in which
Cu—Pc and x have the meaning indicated in the formula (I),
A' and B' independently of each other denote an alkylene group having 2 or 3 carbon atoms and
$R_2''$ denotes an alkyl group having 1 to 3 carbon atoms.

The dyestuffs of the formula (I) are obtained by reacting copper-phthalocyanine sulphochlorides of the formula $$Cu\text{—}Pc\text{—}(SO_2Cl)_x \quad (IV)$$

with an amine of the formula

wherein
Cu—Pc, A, B, $R_1$, $R_2$, $R_3$, n and x have the abovementioned meaning,
if desired in the presence of an acid-binding agent, in water or in a mixture of water and a water-miscible organic solvent, isolating the resulting dyestuffs and if desired bringing them into solution by addition of a water-soluble acid.

Copper-phthalocyanine sulphochlorides of the formula (IV) can carry the sulphochloride groups in the 3- or 4-positions of the benzene nuclei. They are obtained in conventional manner by treating copper-phthalocyanine or copper-phthalocyaninesulphonic acid with chlorosulphonic acid and thionyl chloride. The copper-phthalocyanine sulphochlorides are isolated by pouring the chlorosulphonic acid solutions onto ice, filtering the precipitated copper-phthalocyanine sulphochlorides off with suction, and further processing the filter residues in the form of aqueous pastes.

Examples of amines of the formula (V) are: bis-(3-aminopropyl)-methylamine, bis-(3-aminopropyl)-ethylamine, bis-(3-aminopropyl)-propylamine, bis-(3-aminopropyl)-hydroxyethylamine, bis-(2-aminoethyl)-methylamine, bis-(2-aminoethyl)-ethylamine, bis-(2-aminoethyl)-propylamine, N,N',N'-trimethyl-diethylenetriamine, bis-(4-aminobutyl)-methylamine, N,N',N'',N'''-tetramethyl-tripropylenetetramine, N-methyl-N-(3-aminopropyl)-N'-methyl-N'-(3-aminopropyl)-propylenediamine-1,3,N,N',N''-trimethyl-N-(3-aminoethyl)-diethylenetriamine and N-(2-aminoethyl)-piperazine.

Suitable water-soluble acids for preparing the dyestuff solutions are inorganic or organic acids such as hydrochloric acid, sulphuric acid, phosphoric acid, methanesulphonic acid, ethanesulphonic acid and in particular monobasic or polybasic organic carboxylic acids such as formic acid, acetic acid, hydroxyacetic acid, methoxyacetic acid, ethoxyacetic acid, lactic acid, malic acid, citric acid or mixtures thereof.

Examples of acid-binding agents of the abovementioned type are: sodium carbonate, potassium carbonate, lithium carbonate, sodium hydroxide, potassium hydroxide and lithium hydroxide. It is particularly advantageous to carry out the reaction in excess amine.

For dyeing the printing it is advantageous to use the dyestuffs in the form of their liquid formulations. The aqueous solutions obtained in the course of the invention can contain up to 30% by weight of dyestuff.

It is known that in the dyeing of paper, there is an increasing tendency to use dyestuffs which are chemically readily bleachable in order to ensure in this way that after a chemical bleach with for example hypochlorite solution the coloured paper pulp waste can be reused for papermaking.

Basic phthalocyanine dyestuffs which are based on phthalocyaninesulphonamides are described for example in German Auslegeschriften Nos. 1,061,010, 1,064,661 and 1,049,996. However, the dyeings on paper which are obtained therewith have poor or non-existing hypochlorite bleaching properties.

It has now been found, surprisingly, that the new dyestuffs of the formula (I) are readily bleachable with hypochlorite solution and have excellent fastness to bleeding, in particular excellent soap and lactic acid fastness properties.

The use for dyeing paper is effected in conventional manner. Preferably the dyestuffs are used for pulp-dyeing paper. In this method, the solutions of the dyestuffs are added to the so-called thin stuff or thick stuff before the stuff is drained.

Further application techniques are as follows:

Either a solution of the dyestuff is sprayed onto the paper or the undyed paper is passed before the dry end part is reached through a size press with a trough containing the solution of the dyestuff according to the invention. The spray- or dip-dyed paper is then dried in the dry end part.

The dyestuffs of the formula (I) and in particular of the formula (II) are according to U.S. Pat. No. 4,432,900 also printable on paper in the presence of aldehydes or dialdehydes. The fastness of the dyestuffs to bleeding is further enhanced as a result.

EXAMPLE 1

A water-moist paste of 2/10 mol of Cu—Pc (3)-(SO$_2$Cl)$_{2,1}$ (obtained by treating 115 g of copperphthalocyanine with chlorosulphonic acid and thionyl chloride at temperatures of 100°–102° C., discharging the melt onto ice, filtering off with suction and washing the sulphochloride paste with water) is stirred into 360 g of bis-(3-aminopropyl)-methylamine, and the temperature of the reaction mixture rises to 50°–55° C. The mixture is stirred at 55° C. for one hour and then at 65° C. until the reaction is complete, and is then added to 1000 parts of water, the mixture is filtered with suction and the filter residue is washed with water. Drying leaves 200 g of the dyestuff of the formula

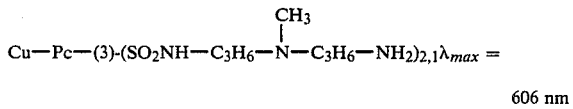

$$\lambda_{max} = 606 \text{ nm}$$

which in the form of its water-soluble salts dyes paper in bright turquoise shades which are readily bleachable. The dyeings obtained have excellent fastness properties, in particular excellent lactic acid fastness and soap fastness.

To prepare a liquid formulation, the dyestuff is dissolved in a mixture of 400 g of water, 100 g of 99% strength acetic acid, 80 g of lactic acid, 15 g of methanesulphonic acid and 500 g of N,N'-dimethylurea or in a mixture of 900 g of water and 300 g of 99% strength acetic acid.

Dyestuffs having similar properties are obtained on replacing the amine mentioned in paragraph 1 by bis-(3-aminopropyl)-ethylamine, bis-(2-aminoethyl)-methylamine on bis-(2-aminoethyl)-ethylamine. The dyestuffs, applied in the form of their water-soluble salts, dye paper in bright turquoise shades which are readily bleachable. The dyeings obtained have excellent fastness to bleeding. The maximum wavelengths of these dyestuffs are between 603 and 606 nm.

EXAMPLE 2

A water-moist paste of 1/10 mol of Cu—Pc (3)-(SO$_2$Cl)$_{2,1}$ (obtained by treating 57.5 g of copperphthalocyanine with chlorosulphonic acid and thiony chloride at temperatures of 100° to 102° C., discharging the melt on dry ice, filtering with suction and washing the sulphochloride paste with water) is stirred at 0° C. to 15° C. into 180 g of N-(2-aminoethyl)-piperazine. The temperature of the reaction mixture is raised to 55° C. in the course of an hour and then to 65° C. in the course of a further hour, and is discharged into 500 ml of water, the mixture is filtered with suction, and the filter residue is washed with water. Drying leaves 100 g of the dyestuff of the formula

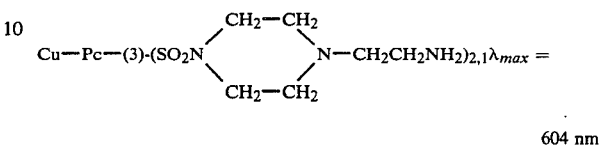

$$\lambda_{max} = 604 \text{ nm}$$

which in the form of its water-soluble salts dyes paper in bright turquoise shades which are readily bleachable. The dyeings obtained have excellent fastness properties, in particular excellent lactic acid fastness and soap fastness.

To prepare a liquid formulation, the dyestuff is dissolved in 250 g of water in the presence of 250 g of N,N'-dimethylurea, 50 g of glacial acetic acid, 30 g of lactic acid and 50 g of citric acid or in a mixture of 450 g of water and 150 g of glacial acetic acid.

Dyestuffs having similar properties are obtained by replacing the N-(2-aminoethyl)-piperazine mentioned in paragraph 1 by N,N',N''-trimethyldiethylenetriamine or N-methyl-N-(3-aminopropyl)-N'-methyl-N'-(3-aminopropyl)-propylene-1,3-diamine. Applied in the form of their water-soluble salts the dyestuffs dye paper in bright turquoise shades which are readily bleachable. The dyes obtained have very good fastness to bleeding. The maximum wavelengths are between 603 and 606 nm.

EXAMPLE 3

A dry stuff consisting of 50% bleached pine sulphate cellulose and 50% bleached deciduous wood sulphate cellulose is mixed with water in a hollander and is milled to a freeness of 30 Schopper-Riegler, so that the solids content is slightly above 2.5%, and the thick stuff is subsequently adjusted with water to a solids content of precisely 2.5%.

200 parts of the thick stuff are combined with 5 parts of a weakly acetic acid 1.5% strength aqueous solution of the dyestuff of Example 16 paragraph 1 and the mixture is stirred for about 5 minutes. The material is then diluted with about 500 parts of water and is then used to prepare sheets of paper in conventional manner, namely by sucking off over a sheet-former. The sheets of paper have a deep turquoise blue colour.

On replacing the abovementioned dyestuff solution by weakly acetic acid or weakly formic acid 1–2% strength solutions of the other dyestuffs which are described in Example 1, likewise produces sheets of paper having a deep turquoise blue colour.

EXAMPLE 4

0.5 g of the dyestuff liquid formulation of Example 1 is added with stirring to 200 g of a 2.5% strength paper pulp consisting of 50% bleached pine sulphate and 50% bleached birch sulphate having a freeness of 35° Schopper-Riegler. The mixture is then sized with 10 g of a 1% strength resin size solution and 20 g of 1% strength aluminium sulphate solution and diluted with 500 g of water. After 15 minutes of stirring the coloured paper pulp is poured onto a sheet-former with a filter paper base and is sucked off. The sheet of paper is couched between two sheets of filter paper and equal-size felts in a press and is then dried at 100° C. on a hot cylinder for about 5 minutes. The result is paper which has a brilliant turquoise colour.

On beating up the paper coloured this way in water and treating the resulting suspension at pH 7 to 2 with 1% active chlorine (based on paper solids), the result is paper material which has barely any colour left.

An analogous procedure can be used to dye with the other dyestuffs described in Example 1.

EXAMPLE 5

10 g of the dyestuff liquid formulation prepared in Example 1 are stirred into a size press solution consisting of 50 g of nonionic starch and 20 g of sizing agent (ABS polymer), and the solution is used to dye unfinished paper or weakly sized paper at 20° C. with a transport speed of about 5 to 7 m/min and a contact pressure of about 25% (laboratory pad-mangle from the firm of W. Mathis, Niderhasli, Switzerland). The result is paper uniformly coloured in a brilliant turquoise and readily bleachable by means of hypochlorite bleach.

An analogous procedure can be used to dye with the other dyestuffs described in Example 1. In each case the result is paper having a brilliant turquoise colour, and being readily bleachable and having excellent fastness properties.

We claim:

1. A basic copper-phthalocyanine dyestuff of the formula

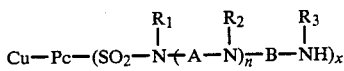

in which
Cu—Pc denotes the radical of an x-valent copper-phthalocyanine,
A and B independently of each other denote an alkylene radial having 2 to 5 carbon atoms,
$R_1$ and $R_3$ independently of each other denote hydrogen or an alkyl radical having 1 to 3 carbon atoms which is unsubstituted or substituted by hydroxyl, $C_1$- to $C_3$-alkoxy, halogen or an $NH_2$ group, $R_2$ denotes an alkyl group having 1 to 3 carbon atoms which is unsubstituted or substituted by hydroxyl, $C_1$- to $C_3$-alkoxy, halogen, n denotes the number 1 to 3,
x denotes the value 1.8 to 2.5,
or if n=1 and A=$C_2H_4$, $R_1+R_2$ may together be an ethylene bridge.

2. A basic copper-phthalocyanine dyestuff according to claim 1 of the formula

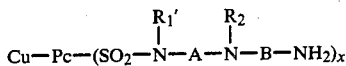

in which
Cu—Pc, A, B, $R_2$ and x have the meanings indicated in claim 1,
$R_1'$ denotes hydrogen or an alkyl radical having 1 to 3 carbon atoms which is unsubstituted or substituted by hydroxyl, $C_1$- to $C_3$-alkoxy or halogen,
or if A=ethylene, $R_1+R_2$ together may be an ethylene bridge.

3. A basic copper-phthalocyanine dyestuff according to claim 1 of the formula

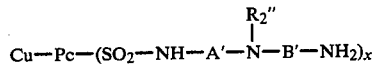

in which
Cu—Pc and x have the meanings indicated in claim 1,
A' and B' independently of each other denote an alkylene group having 2 or 3 carbon atoms and $R_2''$ denotes an alkyl group having 1 to 3 carbon atoms.

4. A basic copper-phthalocyanine dyestuff of the formula

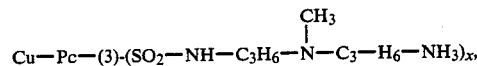

wherein
x=1.8 to 2.5.

5. A basic copper-phthalocyanine dyestuff of the formula

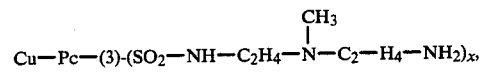

wherein
x=1.8 to 2.5.

* * * * *